United States Patent
Pajela et al.

(10) Patent No.: US 6,544,573 B1
(45) Date of Patent: Apr. 8, 2003

(54) GUM COMBINATION FOR LIQUID CONDIMENT SYSTEMS

(75) Inventors: Lamuel P. Pajela, Teaneck, NJ (US); Christopher Wilson, Ridgefield Park, NJ (US); Thomas John Wajda, Jr., Florida, NY (US)

(73) Assignee: Lipton, Division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/640,506

(22) Filed: Aug. 16, 2000

Related U.S. Application Data

(60) Provisional application No. 60/149,102, filed on Aug. 16, 1999.

(51) Int. Cl.$^7$ ............... A23L 1/05; A23L 1/0534
(52) U.S. Cl. ............... 426/573; 426/578; 426/589; 426/605; 426/613; 426/804
(58) Field of Search ............... 426/573, 578, 426/589, 613, 605, 804

(56) References Cited

U.S. PATENT DOCUMENTS

| | | |
|---|---|---|
| 4,346,120 A | 8/1982 | Morley et al. |
| 4,400,405 A | 8/1983 | Morley et al. |
| 4,400,406 A | 8/1983 | Morley et al. |
| 4,427,701 A | 1/1984 | Morley |
| 4,587,130 A | 5/1986 | Stauber |
| 4,670,272 A | 6/1987 | Chen et al. |
| 4,832,977 A | 5/1989 | Avera |
| 5,079,024 A | 1/1992 | Crane |
| 5,087,471 A | 2/1992 | Combes et al. |
| 5,104,674 A | 4/1992 | Chen et al. |
| 5,209,942 A | 5/1993 | Bauer et al. |
| 5,232,724 A | 8/1993 | Aldcroft et al. |
| 5,286,510 A | 2/1994 | Bauer et al. |
| 5,338,561 A | 8/1994 | Campbell et al. |
| 5,593,716 A | 1/1997 | Appelqvist et al. |
| 5,605,712 A | 2/1997 | Bertrand et al. |
| 5,738,897 A | 4/1998 | Gidley et al. |
| 5,811,148 A | 9/1998 | Chiu et al. |
| 5,895,671 A | 4/1999 | Adamany et al. |

FOREIGN PATENT DOCUMENTS

| | | |
|---|---|---|
| EP | 0 238 330 | 9/1987 |
| EP | 0 340 035 | 11/1989 |
| EP | 0 784 937 A1 | 7/1997 |
| EP | 0 874 554 B1 | 3/2000 |
| WO | 96/11587 | 4/1987 |
| WO | 99/21435 | 5/1999 |

OTHER PUBLICATIONS

CA 1304257C (Abstract).
EP 680700A (Abstract).
JP 4370070A (Abstract).
Derwent Abstract—XRAM ACC No.: C99–082558.
FR 2634105 (Derwent Information).
RD 332070 (Derwent Abstract—XRAM ACC No.: C92–009687).
RD 405047 (Derwent Abstract—XRAM ACC No.: C98–042378).
"Emulsifying and stabilising properties of lecithin/carrageenan systems", Marrssen, FIE. Food Ingredients Europe; Conference Proceedings 1989 Expoconsult Publishers, pp 18–21.
"Stability of Acid Soy Milk", Zhang et al., China Dairy Industry, 25, pp 12–14 (1997).
"Effects of mixed addition of polysaccharides on textural characteristics of soy protein isolate emulsions", Tsai et al., Food Science–Taiwan, 22, 514–520 (1995).
"Gums and their use in food systems", Sanderson, Food Technology, 50, pp 81–84 (1996).
"A focus on gums", Dziesak, Food Technology, 45, pp 116 et seq., (1991).

*Primary Examiner*—Helen Pratt

(57) ABSTRACT

An oil-in-water emulsion containing a gum system having a solids level of 22% or less, which provides a clear to translucent appearance and includes carrageenan, xanthan gum and propylene glycol alginate.

31 Claims, No Drawings

GUM COMBINATION FOR LIQUID CONDIMENT SYSTEMS

This application claims the benefit of U.S. provisional application No. 60/149,102, filed Aug. 16, 1999. The disclosure of which is hereby incorporated by reference herein.

BACKGROUND OF THE INVENTION

FR 2634105 discloses a syrup product, especially for use in manufacturing sorbets, which includes a mixture of invert sugar, sucrose, glucose, carrageenan, alginate, carob gum, guar gum, CMC, xanthan gum, pectin and emulsifier, which may be mono- and di-glyceride based. Polyglycerol fatty acid esters and polyvinylpyrrolidone are among ingredients which may be included.

Bauer et al. U.S. Pat. No. 5,286,510 discloses fat mimetic compositions including I) microcrystalline cellulose, II) cold water swelling starch, III) xanthan, carrageenan, locust bean and/or guar gums, (IV) alginate or alginate derivatives and opacifier. The mimetics are used in low or no fat, reduced calorie salad dressings.

Bauer et al. U.S. Pat. No. 5,209,942 is directed to fat mimetic compositions for low/no fat salad dressings which include a gum selected from a group including xanthan gum, carrageenan, locust bean gum, guar gum and mixtures thereof, and 0–5% alginate or alginate derivatives. It can be formulated at 1–10% in a dressing containing up to 7% fat.

The abstract for Tsai et al. "Effects of mixed addition of polysaccharides on textural characteristics of soy protein isolate emulsions," Food Science-Taiwan, 22, 514–520 (1995) discloses the effects of addition of mixtures of sodium alginate, xanthan gum, and kappa carrageenan on the viscosity of their solutions and textural characteristics of soy protein isolate emulsions. All combinations of 2 polysaccharides were added to the solution. Synergism is said to have been shown among the polysaccharides.

Crane, U.S. Pat. No. 5,079,024 discloses a nonfat cream cheese product which is prepared using a gum which may be guar gum, agar, carrageenan, gum arabic, an alginate, locust bean gum, or mixtures, especially xanthan gum.

Campbell et al., U.S. Pat. No. 5,338,561 discloses an emulsion which preferably includes 0.05–1.5% of a thickener, which is especially locust bean, xanthan, or guar gums, sodium alginate, pectin or carrageenan or mixtures. The emulsion can be incorporated into a dressing or mayonnaise. The emulsion also includes sheared polysaccharides which can be chosen from the group including agar, kappa carrageenan, iota carrageenan, pectin, alginate, gellan or mixtures thereof.

The abstract for CA 1304257 discloses a process for producing vegetable gum dispersions using a gum which may be xanthan gum, carboxymethyl cellulose, alginate, locust bean gum or carrageenan. The process is said to be useful in the manufacture of salad dressings.

Combes, U.S. Pat. No. 5,087,471 is directed to low calorie, non-fat dressings prepared by addition of starch base to a premix containing gum and spice blends and microcrystalline cellulose. The gum blend preferably contains xanthan, locust bean or guar gum, carboxymethyl cellulose, carrageenan, or alginates or mixtures. In Example 2, a gum blend including xanthan gum, propylene glycol alginate and Viscarin gum in a low fat viscous dressing is disclosed. WO 9921435 discloses use of cellulose microfibrils in foodstuffs in association with a polyhydroxy compound. According to Derwent abstract XRAM Acc No C99-082558, the polyhydroxy compound may be an anionic polysaccharide selected from xanthan gum, succinoglycans, carrageenans and alginates. See also, claim 8 wherein the gums are mentioned alone or in admixture. The abstract mentions that treatment of the microfibrils with polyhydroxy compounds improves their redispersibility. The products are used as stabilizers and thickeners in emulsions or dispersions such as salad dressings, fruit juices, vegetable juices, yogurts and milk drinks, especially chocolate milks.

The abstract for EP 680 700 discloses use of biopolymer granules which include guar gum and xanthan gum, and wherein up to 90% of the guar gum and/or xanthan gum can be replaced by locust bean gum, tara gum, carrageenan, pectin, alginate or a food grade thickening cellulose derivative. The granules are especially useful for stabilizing egg white during pasteurization and could also be used in salad dressings, fruit drinks, ice creams, etc.

RD 405047 discloses low fat spreads stabilized with alginate, pectin, carrageenan, guar and/or xanthan, or starch. The stabilizer is added to the fat phase rather than the water phase (Derwent abstraact-XRAM ACC No: C98-042378).

RD 332070 discloses gellan gum used, optionally in combination with other suitable dairy stabilizers such as xanthan gum, guar, carrageenan, locust bean gum or alginate in frozen desserts to provide smooth creamy textures, good mix stability heat shock protection and melt down characteristics (Derwent abstraact-XRAM ACC No: C92-009687).

Other spreads which include stabilizers or thickening agents selected from carrageenan, xanthan and alginate include those of EP 874 554.

U.S. Pat. No. 5,895,671 discloses a no- or low-fat cheese product having similar body, texture and flavor to its full fat counterpart. It is prepared using at least one food grade, polyanionic gum selected from agar, xanthan, alginate, guar, carrageenan, cellulose gums and mixtures thereof.

Appelqvist et al. U.S. Pat. No. 5,593,716 discloses liquid sauces, soups, or gravy products, comprising a dispersed phase of non-starch polysaccharide microgel and a continuous phase of biopolymer solution. The microgel may be made from an alginate, calcium pectin, iota or kappa carrageenan, gellan and/or furcelleran. The biopolymer is gelatin, carrageenan, agar, pectin, alginate, xanthan gum or another.

U.S. Pat. No. 4,670,272 discloses an edible creme which includes a hydrocolloid which may be carrageenan, guar gum, alginate, xanthan gum, (m)ethylcellulose, CMC, hydroxylpropylmethylcellulose and/or microcrystalline cellulose. The creme has a reduced tendency for water migration.

EP 238330 discloses an emulsifier stabilized with a polysaccharide which may be iota or kappa carrageenan, pectin, alginate or xanthan gum. The modified emulsifier enhances the capacity for providing stable emulsions and can be used in salad dressings and other products.

U.S. Pat. No. 5,605,712 discloses a stabilizer composition useful for stabilizing frozen desserts, which includes a first component which includes a microcrystalline cellulose processed with a calcium/sodium alginate complex and a second component which is at least one water soluble hydrocolloid selected from a group including guar gum, locust bean gum, sodium alginate, carrageenan, gum arabic and xanthan gum. The hydrocolloids can be used individually or in mixtures of two or more. Example 1A includes a stabilizer with a first component of microcrystalline cellulose/NaCa alginate complex and a second component of CMC carrageenan.

U.S. Pat. No. 4,587,130 discloses a solid base for mousses which includes a binder which may be gelatin, carrageenan, guar bean flour, alginate, xanthan gum, and/or starch.

U.S. Pat. Nos. 4,427,701 and 4,346,120 disclose a frozen yogurt product comprising at least a first stabilizer selected from a group including guar gum, locust bean gum and propylene glycol alginate, a second stabilizer, and a third stabilizer selected from a group including gelatin, xanthan gum, carrageenan, pectin and sodium alginate.

Gidley et al. U.S. Pat. No. 5,738,897 discloses a suspension of hydrated gelled biopolymer particles wherein the biopolymer is selected from a group including agar, carrageenan, gelatin, alginate and mixtures thereof. The biopolymer may be mixed with an additional hydrocolloid such as xanthan, guar gum or locust bean gum.

Other food uses of gums such as xanthan, alginates and carrageenans or their derivatives are found in EP 784 937, EP 786 947, JP 4370070, U.S. 5,811,148, EP 340035, U.S. Pat. No. 4,832,977, U.S. Pat. No. 4,427,701, U.S. Pat. No. 4,400,406, U.S. Pat. No. 4,400,405, U.S. Pat. No. 5,232,724, U.S. Pat. No. 5,104,674, U.S. Pat. No. 5,087,471, "Emulsifying and stabilising properties of lecithin/carrageenan systems," FIE. Food Ingredients Europe; Conference Proceedings 1989 Expoconsult Publishers, pp18–21, Zhang et al., "Stability of acid soy milk," China Dairy Industry, 25, 12–14 (1997), Sanderson, "Gums and their use in food systems," Food Technology, 50, pp 81–84 (1996), Dziesak, "A focus on Gums," Food Technology 45, pp 116 et seq., (1991),

SUMMARY OF THE INVENTION

The present invention is directed to a gum combination which suspends particulates (including dried herbs), emulsifies and provides freeze/thaw stability, particularly in low viscosity, low fat, condiment systems. The gum system provides suspension while emulsifying at relatively low viscosity and low soluble solids level. The gum system also provides a clear to translucent appearance which is not provided by more typical emulsification systems.

The gum system of the invention comprises xanthan gum, alginate, and a carrageenan. Preferably the alginate is proplene glycol alginate and the carrageenan is iota carrageenan. The food in which the invention is used is preferably a salad dressing, although the invention may be used to prepare other liquid condiments.

The compositions of the invention are generally oil and water emulsions and preferably include about 6% triglycerides or less. The products of the invention are preferably low viscosity products. For example, the products may have viscosities of 1760 cps and below, especially from 1370 to 1760 cps. The triglyceride oil is preferably soy bean oil.

The products of the invention will include some water. Especially preferred are compositions wherein the water comprises from about 57% to about 63% of the composition.

The products of the invention will generally have about 10% or less sucrose, especially from about 6% to about 10%.

Preferred amounts for the gums are 0.07% to about 0.08% of an alginate, about 0.2% carrageenan and about 0.2% xanthan gum.

The compositions of the invention will often include vinegar. Vinegar (100 grain) may be present at, for example, about 10% to about 14%. Likewise, salt is often included, for example, from about 2% to about 3.5%.

In a preferred embodiment, the condiment is a salad dressing. In a still more preferred embodiment the salad dressing is a vinaigrette. Still more preferred is a clear or more translucent condiment.

Preferably the level of solids is 22 wt % or less, especially from 17–22 wt %.

Polysorbate 60 may be used as an emulsifier, if desired.

For a more complete understanding of the above and other features and advantages of the invention, references should be made to the following detailed description of the preferred embodiments.

DETAILED DESCRIPTION OF THE INVENTION

In addition to the ingredients mentioned above, the liquid condiment of the invention may include many other ingredients typical for such compositions. Vinegar is often used and may be red wine vinegar or distilled white vinegar. Various fruit and vegetable juices may be used, including apricot puree, tomato juice, onion puree, roasted garlic puree, garlic juice, onion juice, etc.

An advantageous feature of the present invention is that particulates such as dried herbs are suspended. Examples of herbs and vegetables which may be used include red bell pepper puree, roasted red bell pepper puree, garlic dehy minced, mixed herbs, red bell pepper gran, minced garlic, minced onion, etc.

A preferred source of iota carrageenan in accordance with the invention is sold as Viscarin SD 389. Other ingredients typically used in liquid condiments may also be included, such as sorbic acid, vitamin E, EDTA, and beta carotene for color.

Salt may be added in the form of sodium chloride granules. If desired, a blend of seasonings may be employed.

In preparing the products of the invention, it is preferred to hydrate the stabilizers in water prior to mixing with other ingredients.

EXAMPLES

1. A zesty Italian salad dressing was prepared by mixing the following ingredients.

TABLE 1

| Ingredients | % | lbs. |
|---|---|---|
| WATER | 57.0789 | 246.06 |
| SOYBEAN OIL | 5.3416 | 23.03 |
| XANTHAN GUM | 0.1700 | 0.73 |
| PROPYLENE GLYCOL ALGINATE | 0.0700 | 0.30 |
| Viscarin SD 389 | 0.2000 | 0.86 |
| BETA CRTN 2% EMUL WD, W & J | 0.0500 | 0.22 |
| Mix for 10 mins. | | |
| HERBS, VEGETABLE PUREES AND JUICES | 9.345 | 39.68 |
| VITAMIN E ACETATE | 0.0139 | 0.06 |
| RED CHILI PEPPER | 0.0641 | 0.28 |
| ITALIAN SEASON BLEND, NEW | 0.1749 | 0.75 |
| SUCROSE | 10.2222 | 44.07 |
| COOLING FLAVOR | 0.0939 | 0.40 |
| RED WINE VNGR 100GR | 6.0583 | 26.12 |
| WHT WINE VINEGAR | 7.7477 | 33.40 |
| SODIUM CHLORIDE GRANULAR | 3.5053 | 15.11 |
| Mix for 10 mins. | | |

2. As seen in Table 1, a first series of ingredients was mixed for 10 minutes. Subsequently, another group of ingredients was added after which the product was mixed for another 10 minutes. The product had a pH of 3.2, a Titratable Acidity (Ta) of 1.665, a density of 1.076g/ml and a viscosity of 1760 cps.

3. A low fat country Italian salad dressing was prepared having the ingredients listed in Table 2.

TABLE 2

LOW FAT COUNTRY ITALIAN

| Ingredients | | Batch Wt (lbs) + 396.85 | | | |
|---|---|---|---|---|---|
| | | TOTAL | Units | | |
| | | % | Lbs | Gals | Gms |
| WATER | BL | 62.9875 | 249.97 | 29.98 | ********** |
| RED WINE VINEGAR-NO COLOR | L | 6.6349 | 26.33 | | 11,943.6 |
| HERBS, FRUIT & VEG. JUICES & PUREES | | 12.2157 | 48.47 | | 21989.6 |
| SUCROSE | | 6.4208 | 25.48 | | 11,558.3 |
| SOYBEAN OIL | BL | 5.5065 | 21.85 | 2.86 | 9,912.4 |
| DISTILLED WHITE VINEGAR | BL | 3.2511 | 12.90 | 1.53 | 5,852.4 |
| SODIUM CHLORIDE GRANULES | | 1.9976 | 7.93 | | 3,595.9 |
| CARRAGEENAN | | 0.1998 | 0.79 | | 359.6 |
| HERBS | L | 0.1962 | 0.78 | | 353.2 |
| XANTHAN GUM, TYPE "T" | O | 0.1712 | 0.68 | | 308.2 |
| RED BELL PEPPER GRAN. | L | 0.1498 | 0.59 | | 269.7 |
| COOLING FLAVOR | | 0.1177 | 0.47 | | 211.9 |
| PROPYLENE GLYCOL ALGINE | | 0.0799 | 0.32 | | 143.8 |
| SORBIC ACID | | 0.0499 | 0.20 | | 89.9 |
| VITAMIN E | | 0.0146 | 0.06 | | 26.3 |
| EDTA | | 0.0068 | 0.03 | | 12.2 |
| | | 100.000 | 396.85 | | ********** |

4. 5% of the water was used to hydrate the herbs, garlic and peppers. To 100 pounds of the water was added a slurry including Keltrol T. Then the remaining oil was added. After 25 minutes, the remaining water was added. After 10 minutes the preservative, sugar, hydrated garlic, spices and herbs, apricot, vegetable, purees, vinegar and salt were added. The product had a viscosity of 1370 cps, a Ta of 0.124 and a pH of 3.130.

Percentages herein are wt % unless indicated otherwise.

It should be understood, of course, that the specific forms of the invention herein illustrated and described are intended to represented only as certain changes may be made therein without the departing of the clear teachings of the disclosure. Accordingly, reference should be made to the following appended claims in determining the full scope of the invention.

What is claimed is:

1. An oil-in-water emulsion having a solids level of 22% or less comprising a gum system which provides a clear to translucent appearance and consist of carrageenan, xanthan gum and propylene glycol alginate.

2. The oil in water emulsion according to claim 1 wherein said carrageenan comprises iota carrageenan.

3. The emulsion according to claim 1 wherein said system further comprises triglyceride oil.

4. The oil-in-water emulsion according to claim 1 comprising about 6% triglycerides or less.

5. The oil-in-water emulsion according to claim 1 comprising about 6% triglycerides.

6. A salad dressing comprising the oil-in-water emulsion according to claim 1.

7. The emulsion according to claim 1 further having a viscosity of from 1760 cps or less.

8. The emulsion according to claim 1 comprising from about 57% to about 63% water.

9. The emulsion according to claim 1 having a viscosity of from 1370 to 1760 cps.

10. The emulsion according to claim 9 having about 5 to about 6% soybean oil.

11. The emulsion according to claim 1 having about 10% or less sucrose.

12. The emulsion according to claim 1 having from about 6 to about 10% sucrose.

13. The emulsion according to claim 1 comprising from 0.07 to about 0.08% of an alginate.

14. The emulsion according to claim 13 wherein the alginate is propylene glycol alginate.

15. The emulsion according to claim 1 comprising about 0.2% carrageenan.

16. The emulsion according to claim 1 comprising said xanthan at about 0.2% xanthan gum or less.

17. The emulsion according to claim 1 further comprising vinegar.

18. The emulsion according to claim 17 wherein said vinegar is present at from about 10% to about 14%.

19. The emulsion according to claim 1 comprising salt.

20. The emulsion according to claim 19 wherein said salt is present at from about 2% to about 3.5%.

21. The emulsion according to claim 1 further comprising sucrose.

22. The salad dressing according to claim 1 which is a vinaigrette.

23. The emulsion according to claim 1 having a viscosity of about 1800 cps or below.

24. The emulsion according to claim 1 having a viscosity of about 1200–2000 cps.

25. The emulsion according to claim 1 comprising 0.07 to 0.09 wt % of an alginate.

26. A salad dressing having a solids level of 22% or less comprising a gum system which provides a clear to translucent appearance and consist of carrageenan, xanthan gum, propylene glycol alginate mixture and further comprising, water, sucrose, vinegar, and triglyceride oil.

27. The salad dressing according to claim 26 further comprising salt.

28. A condiment having a solid level of 22% or less comprising a gum system which provides a clear to translucent appearance consist of carrageenan, xanthan gum and propylene glycol alginate.

29. The condiment according to claim 28 which is clear or translucent.

30. The condiment according to claim 28 having a pH of 3.3 or less.

31. The condiment according to claim 30 shaving a pH of between 3.2 and 3.3.

* * * * *